(12) United States Patent
Kim et al.

(10) Patent No.: US 9,297,447 B2
(45) Date of Patent: Mar. 29, 2016

(54) TRANSMISSION SYSTEM OF HYBRID ELECTRIC VEHICLE

(71) Applicant: Hyundai Motor Company, Seoul (KR)

(72) Inventors: Baekyu Kim, Suwon-si (KR); Taesic Park, Busan (KR); Seokjoon Kim, Yongin-si (KR); Chulmin Ahn, Busan (KR); Sunggon Byun, Anyang-si (KR); Kwangmin Choi, Seoul (KR); Junhoi Huh, Hanam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/559,700

(22) Filed: Dec. 3, 2014

(65) Prior Publication Data

US 2016/0061305 A1 Mar. 3, 2016

(30) Foreign Application Priority Data

Aug. 26, 2014 (KR) .......................... 10-2014-0111407

(51) Int. Cl.
*B60K 6/442* (2007.10)
*F16H 57/04* (2010.01)
*F16H 3/72* (2006.01)
*F16H 37/04* (2006.01)

(52) U.S. Cl.
CPC .............. *F16H 37/046* (2013.01); *B60K 6/442* (2013.01); *F16H 57/0476* (2013.01); *F16H 2037/048* (2013.01); *F16H 2200/2005* (2013.01); *F16H 2200/2033* (2013.01); *Y10S 903/917* (2013.01)

(58) Field of Classification Search
CPC . F16H 3/725; F16H 57/0476; F16H 57/0471; F16H 2200/2005; F16H 2200/2033; F16H 2200/2082; B60K 6/442
See application file for complete search history.

(56) References Cited

U.S. PATENT DOCUMENTS

| | | | |
|---|---|---|---|
| 5,513,719 A * | 5/1996 | Moroto | B60K 6/24 180/65.21 |
| 6,910,981 B2 | 6/2005 | Minagawa et al. | |
| 7,189,177 B2 | 3/2007 | Takasu et al. | |
| 8,430,190 B2 | 4/2013 | Honda et al. | |
| 2013/0260936 A1* | 10/2013 | Takei | B60K 6/365 475/5 |
| 2013/0345009 A1* | 12/2013 | Iwasa | B60K 6/365 475/5 |

FOREIGN PATENT DOCUMENTS

| | | |
|---|---|---|
| JP | 3045063 B2 | 5/2000 |
| JP | 2000-203289 A | 7/2000 |
| JP | 2006-137333 A | 6/2006 |
| KR | 10-0717306 B1 | 5/2007 |
| KR | 10-1416422 B1 | 7/2014 |

* cited by examiner

*Primary Examiner* — James Pilkington
*Assistant Examiner* — Tinh Dang
(74) *Attorney, Agent, or Firm* — Morgan, Lewis & Bockius LLP

(57) ABSTRACT

A transmission system of a hybrid electric vehicle may include first and second motor/generators, a planetary gear set, first and second output gears, a brake, a rotation restricting member on an axis of an input shaft receiving torque of an engine in a transmission housing and a hollow shaft disposed at a radial exterior of the input shaft and adapted to transmit the torque of the engine or torque of the first motor/generator to the second output gear, an outer shaft disposed at a radial exterior of the hollow shaft and adapted to transmit torque of the second motor/generator to the first output gear, and a rear cover coupled to a rear end portion of the transmission housing.

13 Claims, 4 Drawing Sheets

TRANSMISSION SYSTEM OF HYBRID ELECTRIC VEHICLE

CROSS-REFERENCE TO RELATED APPLICATION

The present application claims priority to Korean Patent Application No. 10-2014-0111407 filed Aug. 26, 2014, the entire contents of which is incorporated herein for all purposes by this reference.

BACKGROUND OF THE INVENTION

1. Field of the Invention

The present invention relates to a transmission system of a hybrid electric vehicle. More particularly, the present invention relates to a transmission system of a hybrid electric vehicle that can achieve electric vehicle (EV) mode, power split mode and overdrive (OD) mode.

2. Description of Related Art

Generally, a hybrid electric vehicle is a vehicle which uses two different power sources efficiently.

Such a hybrid electric vehicle typically uses an engine and a motor/generator. The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such a durability, power delivery efficiency, and size depend on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission system of a hybrid electric vehicle having advantages of achieving a compact design by rotatably supporting a sun gear of a planetary gear set and a hub connected to rotor of a first motor/generator on a transmission housing through one bearing and rotatably supporting a ring gear of the planetary gear set and a hollow shaft on the transmission housing through one bearing.

In addition, various aspects of the present invention are directed to providing a transmission system of a hybrid electric vehicle having further advantages of shortening a length of the transmission housing by mounting a bearing between the hub connected to the rotor of the first motor/generator and a fixed end formed on an inner surface of a rear cover through an interior circumference of the hub.

In addition, various aspects of the present invention are directed to providing a transmission system of a hybrid electric vehicle which can reduce parking impact by disposing a parking gear on an outer shaft having relatively large inertia.

In addition, various aspects of the present invention are directed to providing a transmission system of a hybrid electric vehicle where a tank for collecting a churning oil is disposed above first and second output gears disposed between a second motor/generator and an engine. Therefore, cooling oil is supplied to the second motor/generator easily when the vehicle runs at EV mode.

According to various aspects of the present invention, a transmission system of a hybrid electric vehicle may include first and second motor/generators, a planetary gear set, first and second output gears, a brake and a rotation restricting member on an axis of an input shaft receiving torque of an engine in a transmission housing, and a hollow shaft disposed at a radial exterior of the input shaft and adapted to transmit the torque of the engine or torque of the first motor/generator to the second output gear, an outer shaft disposed at a radial exterior of the hollow shaft and adapted to transmit torque of the second motor/generator to the first output gear, and a rear cover coupled to a rear end portion of the transmission housing, in which the planetary gear set may include a sun gear, a planet carrier and a ring gear as rotation elements thereof, the sun gear may be rotatably supported on the transmission housing through a first bearing in a state of being splined to a hub connected to a rotor of the first motor/generator, the ring gear may be connected to a connecting member through the hollow shaft rotatably supported on the transmission housing through a second bearing, and the planet carrier may be rotatably supported by third bearings disposed respectively between the planet carrier and the sun gear and between the planet carrier and an extended end of the hollow shaft.

The rotation restricting member, the second output gear, the first output gear, the second motor/generator, the planetary gear set, the first motor/generator, and the brake may be sequentially disposed from the engine side to a rear of the transmission housing.

The first motor/generator may be rotatably supported by a fourth bearing interposed between one end portion of an interior circumference of the hub connected to the rotor of the first motor/generator and an exterior circumference of a fixed end formed on an inner surface of the rear cover, and the first bearing may be interposed between another end portion of an exterior circumference of the hub and the transmission housing.

Each of the first, second, and fourth bearing may be a ball bearing, and the third bearing may be a thrust bearing.

The rotation restricting member may be a one-way clutch, a two-way clutch or a brake.

The transmission system may further include a parking gear disposed between the first output gear and the second output gear and connected to the outer shaft.

A snap ring for fixing the parking gear in an axial direction and a fixing ring for preventing decoupling of the snap ring may be mounted on the outer shaft.

The second output gear may be splined to a front end portion of the hollow shaft, and a fifth bearing may be interposed between an exterior circumference of an extended portion of the second output gear and the transmission housing.

A hub connected to a rotor of the second motor/generator may be splined to the outer shaft, and a snap ring for fixing the hub in an axial direction and a fixing ring for preventing decoupling of the snap ring may be mounted on the outer shaft.

The brake may be disposed between the rear cover and the hub connected to the rotor of the first motor/generator.

A tank for collecting a churning oil may be disposed above the first and second output gears in the transmission housing.

A lubrication pipe may be mounted between the input shaft and a fixed end formed on an inner surface of the rear cover.

One end of the lubrication pipe may be fixedly inserted in an oil path of the fixed end and another end of the lubrication pipe may be inserted in an oil path of the input shaft with forming a gap therebetween.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
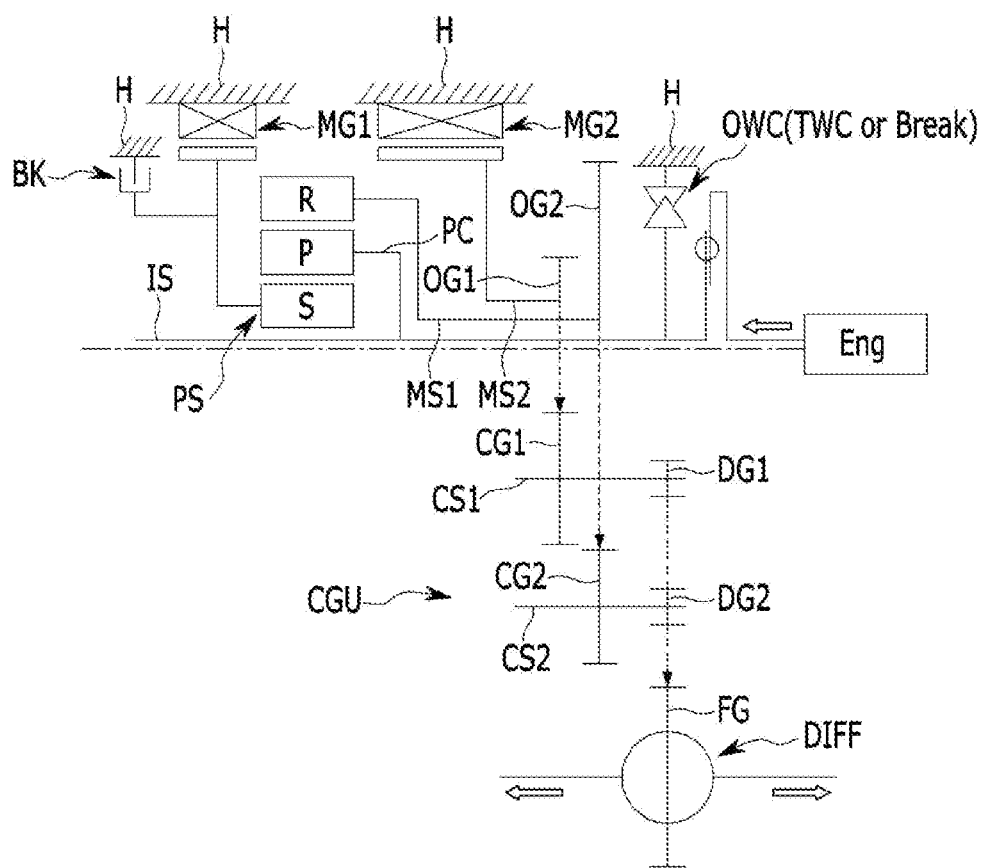
FIG. 1 is a schematic diagram of an exemplary transmission system of a hybrid electric vehicle according to the present invention.

FIG. 1 is a schematic diagram of a transmission system of a hybrid electric vehicle according to various embodiments of the present invention.

Referring to FIG. 1, a transmission system of a hybrid electric vehicle according to various embodiments of the present invention changes torques of an engine Eng and first and second motor/generators MG1 and MG2 according to running state of the vehicle and outputs the changed torques through first and second output gears OG1 and OG2.

The transmission system includes the first and second motor/generators MG1 and MG2, a planetary gear set PS, the first and second output gears OG1 and OG2, a brake BK, a rotation restricting member (OWC, TWC, or brake), and a speed reduction unit CGU.

Each of the first motor/generator MG1 and the second motor/generator MG2 is independent power source and operates as a motor or a generator.

The first motor/generator MG1 is directly connected to a sun gear S of the planetary gear set PS so as to be operated as a motor for supplying torque to the planetary gear set PS through the sun gear S.

The second motor/generator MG2 is directly connected to the first output gear OG1 through an outer shaft MS2 so as to be operated as a motor for supplying torque to the first output gear OG1.

For this purpose, a stator of the first motor/generator MG1 and a stator of the second motor/generator MG2 are respectively fixed to a transmission housing H, and a rotor of the first motor/generator MG1 and a rotor of the second motor/generator MG2 are connected respectively to the sun gear of the planetary gear set PS and the first output gear OG1.

The first and second motor/generators MG1 and MG2 and the planetary gear set PS are disposed on an input shaft IS.

At this time, the first output gear OG1 is operated as an output gear outputting the torque of the second motor/generator, and the second output gear OG2 is operated as an output gear outputting the torques of the engine Eng and the first motor/generator received through the planetary gear set PS.

In addition, the brake BK may be a conventional multi-plate friction element. In various embodiments of the present invention, a one-way clutch OWC is used as the rotation restricting member, but is not limited thereto. A two-way clutch TWC or a brake may be used as the rotation restricting member.

The transmission system of a hybrid electric vehicle will be described in detail.

The planetary gear set PS is a single pinion planetary gear set, and includes the sun gear S, a planet carrier PC rotatably supporting a pinion P externally engaged with the sun gear S and a ring gear R internally engaged with the pinion P as rotation elements thereof.

The sun gear S is directly connected to the first motor/generator MG1 and is selectively fixed to the transmission housing H, the planet carrier PC is directly connected to the input shaft IS, and the ring gear R is operated as an output element.

The first motor/generator MG1 operates as a motor connecting with the sun gear S of the planetary gear set PS and driving the sun gear S.

The second motor/generator MG2 is connected to the first output gear OG1 and transmits torque to the first output gear OG1.

The brake BK is operated at overdrive (OD) and is disposed between the sun gear S of the planetary gear set PS and the transmission housing H. The brake BK selectively connects the sun gear S with the transmission housing H such that the sun gear S is selectively operated as a fixed element.

The one-way clutch OWC is disposed between an input shaft IS and the transmission housing H and rotates the input shaft IS only in one direction.

In addition, the ring gear R of the planetary gear set PS is directly connected to the second output gear OG2 through the hollow shaft MS1 such that the torque of the engine Eng and/or the first motor/generator MG1 is input to the second output gear OG2.

In addition, rotation speeds of the first and second output gears OG1 and OG2 are decreased by the speed reduction unit CGU, and the decreased rotation speed is transmitted to a final reduction gear FG of a differential apparatus DIFF.

The speed reduction unit CGU includes first and second intermediate shafts CS1 and CS2 disposed between the input shaft IS and the differential apparatus DIFF and in parallel with the input shaft IS.

A first intermediate gear CG1 is fixedly disposed on one end portion of the first intermediate shaft CS1 and is engaged with the first output gear OG1, and a second intermediate gear CG2 is fixedly disposed on the second intermediate shaft CS2 and is engaged with the second output gear OG2.

In addition, first and second drive gears DG1 and DG2 are fixedly disposed on the other end portions of the first and second intermediate shafts CS1 and CS2 and are engaged with the final reduction gear FG of the differential apparatus DIFF, respectively.

At this time, since diameters of the first and second intermediate gears CG1 and CG2 are larger than those of the first and second drive gears DG1 and DG2, the speed reduction unit CGU decreases rotation speeds of the first and second output gears OG1 and OG2 and transmits the decreased rotation speed to the final reduction gear FG.

The transmission system of a hybrid electric vehicle can achieve EV mode, power split mode, and OD mode.

The one-way clutch OWC is operated at the EV mode, the brake BK is operated at the OD mode, and none of the one-way clutch OWC and the brake BK is operated at the power split mode used frequently in city driving.

The input shaft IS can rotate only in one direction by operation of the one-way clutch OWC and the engine Eng is maintained in a stopped state at the EV mode.

The first and second motor/generators MG1 and MG2 are operated simultaneously and the torques of the first and second motor/generators MG1 and MG2 are transmitted to the final reduction gear FG of the differential apparatus DIFF at the EV mode.

That is, the torque of the first motor/generator MG1 is output to second output gear OG2 through the planetary gear set PS as inverse rotation speed, and the torque of the second motor/generator MG2 is output to the first output gear OG1 without rotational speed change. Therefore, an electric continuously variable transmission can be achieved by speed control of the first and second motor/generators MG1 and MG2.

At this time, the torque of the first motor/generator MG1 is transmitted to the final reduction gear FG of the differential apparatus DIFF through the planetary gear set PS, the second output gear OG2, the second intermediate gear CG2, and the second drive gear DG2, and the torque of the second motor/generator MG2 is transmitted to the final reduction gear FG of the differential apparatus DIFF through the first output gear OG1, the first intermediate gear CG1, and the first drive gear DG1.

The power split mode is a mode used in the city driving. None of the brake BK and the one-way clutch OWC is operated at the power split mode.

The engine Eng and the first and second motor/generators MG1 and MG2 are simultaneously operated such that the torques of the engine Eng and the first and second motor/generators MG1 and MG2 are transmitted to the final reduction gear FG of the differential apparatus DIFF at the power split mode.

That is, after being input to the planet carrier PC of the planetary gear set PS through the input shaft IS, the torque of the engine Eng is transmitted to the second output gear OG2 through the ring gear R as main power, and the torque of the second motor/generator MG2 is transmitted to the first output gear OG1 as auxiliary power.

At this time, if the torque of the first motor/generator MG1 is input to the sun gear S of the planetary gear set PS, the sun gear S is operated as a reaction element and the torque of the engine Eng is output through the planet carrier PC.

The planetary gear set PS is not directly involved in shift and an electric continuously variable transmission can be achieved by speed control of the first and second motor/generators MG1 and MG2 at the power split mode.

The torques of the engine Eng and the second motor/generator MG2 input to the first and second output gears OG1 and OG2 is transmitted to the final reduction gear FG of the differential apparatus DIFF through the first and second intermediate gears CG1 and CG2 and the first and second drive gears DG1 and DG2.

In addition, the torque of the engine Eng is used as main power and the torque of the second motor/generator MG2 is used as auxiliary power at the OD mode.

The torque of the engine Eng is input to the planet carrier PC of the planetary gear set PS through the input shaft IS at the OD mode. In this case, since the sun gear S is operated as a fixed element by operation of the brake BK, rotation speed of the input shaft IS increases and the increased rotation speed is transmitted to the second output gear OG2 through the ring gear R. At the same time, the torque of the second motor/generator MG2 is transmitted to the first output gear OG1.

The planetary gear set PS is not directly involved in the shift and an electric continuously variable transmission can be achieved by the torque of the engine Eng transmitted to the second output gear OG2 through the input shaft IS and the planetary gear set PS, and the torque of the second motor/generator MG2 transmitted to the first output gear OG1 at the OD mode.

The torques of the engine Eng and the second motor/generator MG2 input to the first and second output gears OG1 and OG2 are transmitted to the final reduction gear FG of the differential apparatus DIFF through the first and second intermediate gears CG1 and CG2 and the first and second drive gears DG1 and DG2.

Therefore, all of the engine Eng and the first motor/generator MG1 and second motor/generator MG2 can generate driving torque, and gear ratio can be continuously changed by speed control of the first motor/generator MG1 and the second motor/generator MG2. Therefore, fuel economy may be improved.

The transmission system of a hybrid electric vehicle will hereinafter be described in further detail.

Figure 2:
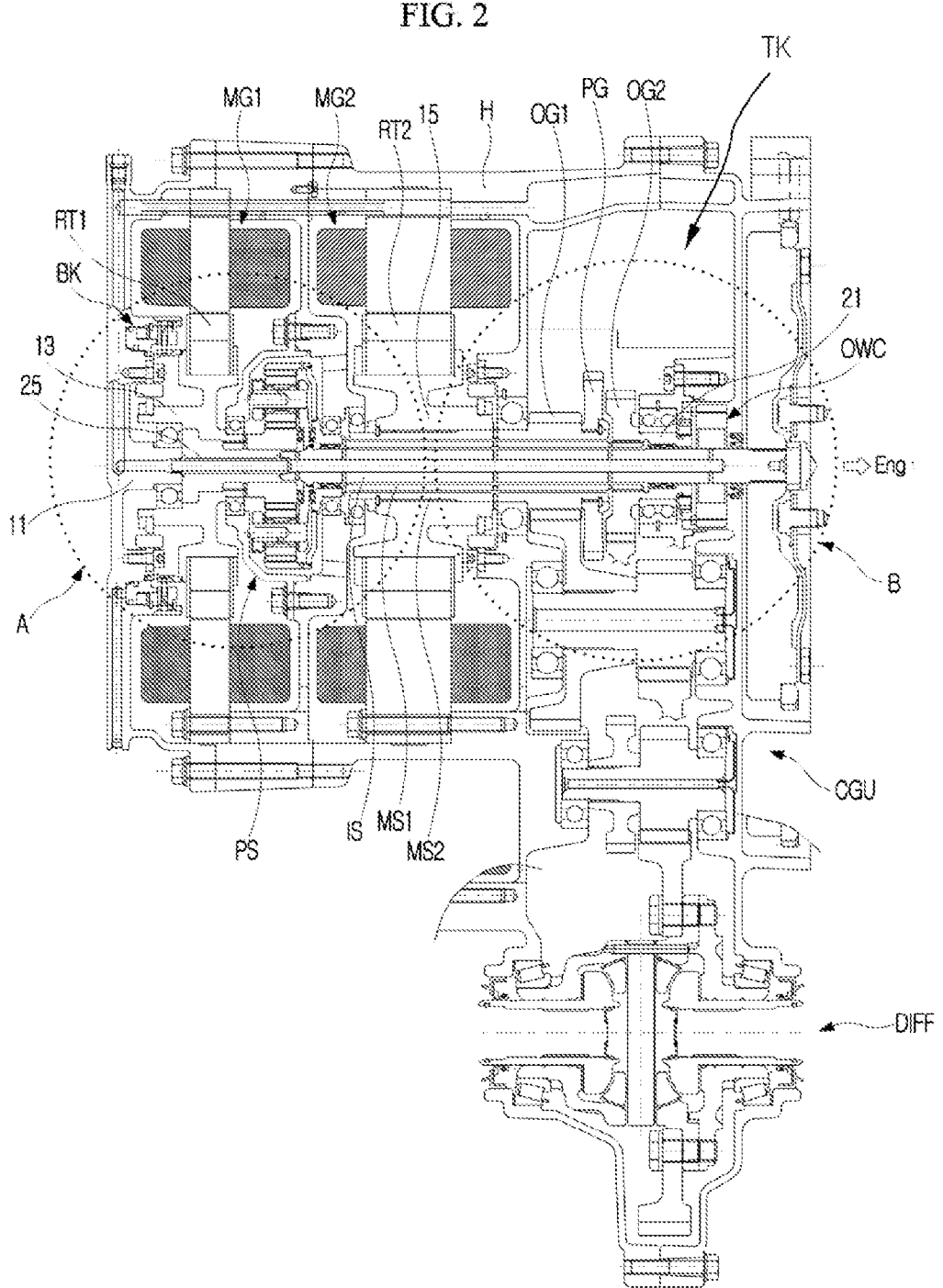
FIG. 2 is a cross-sectional view of an exemplary transmission system of a hybrid electric vehicle according to the present invention.
Figure 3:
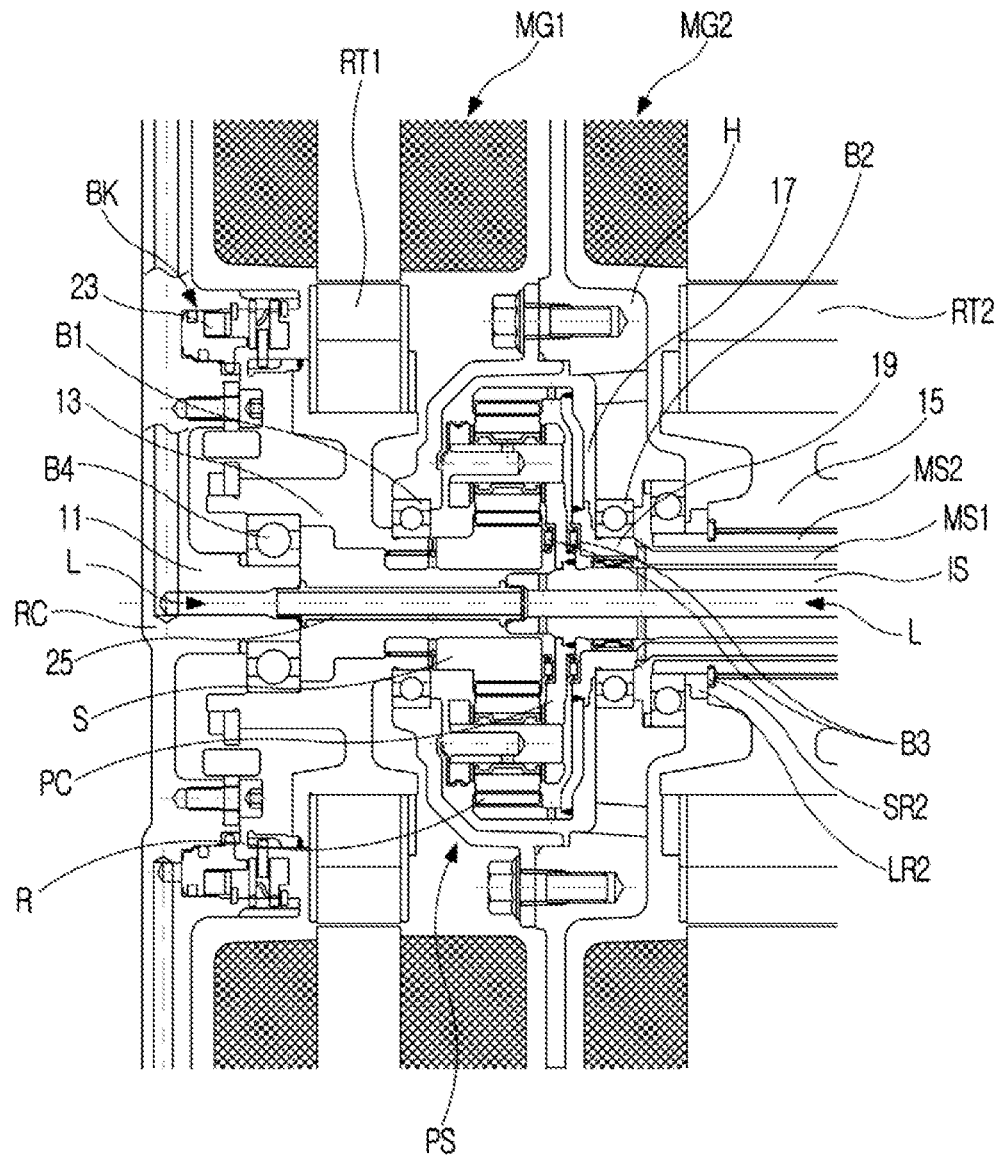
FIG. 3 is an enlarged cross-sectional view of A portion in FIG. 2.
Figure 4:
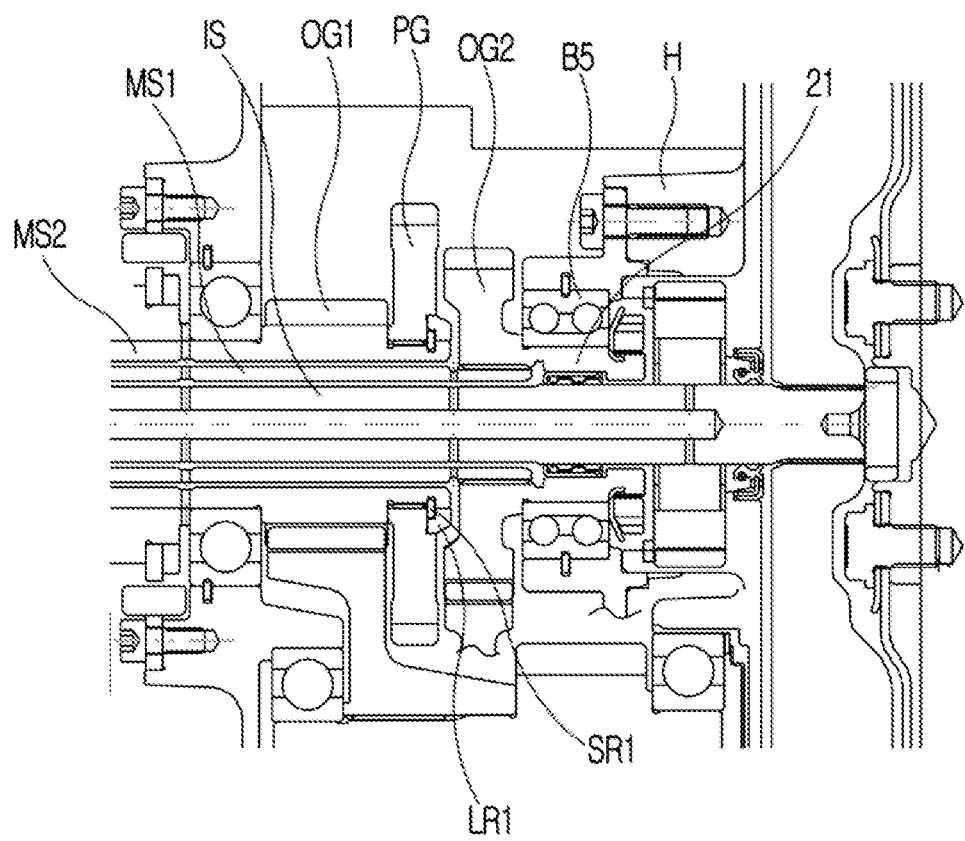
FIG. 4 is an enlarged cross-sectional view of B portion in FIG. 2.

FIG. 2 is a cross-sectional view of a transmission system of a hybrid electric vehicle according to various embodiments of the present invention, and FIG. 3 and FIG. 4 are enlarged cross-sectional views of A portion and B portion in FIG. 2, respectively.

Referring to FIG. 2, the first and second motor/generators MG1 and MG2, the planetary gear set PS, the first output gear OG1 for the second motor/generator MG2, the second output gear OG2 for the engine Eng, the brake BK for overdrive (OD) and the one-way clutch OWC are disposed on an axis of the input shaft IS into which the torque of the engine Eng is input in the transmission system of a hybrid electric vehicle according to various embodiments of the present invention.

At this time, the one-way clutch OWC, the second output gear OG2, the first output gear OG1, the second motor/generator MG2, the planetary gear set PS, the first motor/generator MG1 and the brake BK are sequentially disposed on the axis of the input shaft IS from the engine Eng to the rear.

In addition, the hollow shaft MS1 for transmitting the torque of the engine Eng or the torque of the first motor/generator MG1 to the second output gear OG2 is disposed at a radial exterior of the input shaft IS concentrically with the input shaft IS, and the outer shaft MS2 for transmitting the torque of the second motor/generator MG2 to the first output gear OG1 is disposed at a radial exterior of the hollow shaft MS1.

At this time, referring to FIG. 3, the sun gear S of the planetary gear set PS is splined to a hub 13 connected to the rotor RT1 of the first motor/generator MG1, and the sun gear S and the hub 13 are rotatably supported on the transmission housing H through a first bearing B1.

In addition, the ring gear R of the planetary gear set PS is connected to the hollow shaft MS1 rotatably supported on the transmission housing H through a second bearing B2 via a connecting member 17.

In addition, third bearings B3 are disposed respectively between one surface of the planet carrier PC of the planetary gear set PS and the sun gear S and between the other surface of the planet carrier PC and an extended end 19 of the hollow shaft MS1 so as to rotatably support the planet carrier PC.

In addition, a fourth bearing B4 is interposed between one end portion of an interior circumference of the hub 13 connected to the rotor RT1 of the first motor/generator MG1 and an exterior circumference of a fixed end 11 formed on an inner surface of a rear cover RC coupled to a rear end portion of the transmission housing H, and the first bearing B1 is interposed between the other end portion of an exterior circumference of the hub 13 and the transmission housing H. Therefore, the rotor RT1 is rotatably supported.

That is, since the fourth bearing B4 mounted between the hub 13 connected to the rotor RT1 of the first motor/generator MG1 and the fixed end 11 formed at the inner surface of the rear cover RC is inserted into the interior circumference of the hub 13, a length of the transmission housing H may be shortened.

Herein, each of the first, second, and fourth bearing B1, B2, and B4 is a ball bearing, and the third bearing B3 is a thrust bearing. In addition, the rear cover RC is mounted at the rear end portion of the transmission housing H.

Referring to FIG. 4, a parking gear PG is disposed between the first output gear OG1 and the second output gear OG2 and is splined to the outer shaft MS2.

That is, since the parking gear PG is connected to the outer shaft MS2 having relatively large inertia, parking impact may be reduced.

In addition, movement of the parking gear PG connected to the outer shaft MS2 in an axial direction is limited by a snap ring SR1 mounted on the outer shaft MS2, and the snap ring SR1 is fixed to the outer shaft MS2 by the fixing ring LR1 in the axial direction and in a radial direction such that decoupling of the snap ring SR1 is prevented when rotating with high speed.

In addition, the second output gear OG2 is splined to a front end portion of the hollow shaft MS1, a fifth bearing B5 is interposed between exterior circumference of an extended end 21 extended toward the front portion of the second output gear OG2 and the transmission housing H such that the second output gear OG2 is rotatably supported on the transmission housing H.

Referring to FIG. 3, the hub 15 connected to the rotor RT2 of the second motor/generator MG2 is splined to the outer shaft MS2 and movement of the hub 15 is limited in the axial direction by a snap ring SR2. In addition, the snap ring SR2 is fixed to the outer shaft MS2 in the axial direction and in the radial direction by a fixing ring LR2. Therefore, decoupling of the snap ring SR2 is prevented when rotating with high speed.

In addition, the brake BK is disposed between the rear cover RC coupled to the rear end portion of the transmission housing H and the hub 13 connected to the rotor RT1 of the first motor/generator MG1. At this time, a piston 23 of the brake BK is disposed so as to face the rear cover RC.

Referring to FIG. 2, a tank TK for collecting a churning oil is disposed above the first and second output gears OG1 and OG2 between the second motor/generator MG2 and the engine Eng in the transmission housing H. Therefore, a space in the transmission housing H can be utilized effectively and a cooling oil can be supplied to the second motor/generator MG2 easily.

In addition, a lubrication pipe 25 is mounted between the input shaft IS and the fixed end 11 formed at the rear cover RC. One end of the lubrication pipe 25 is fixedly inserted in an oil path L of the fixed end 11 and the other end of the lubrication pipe 25 is inserted in an oil path L of the input shaft IS with forming a gap therebetween. Therefore, the lubrication pipe 25 guides a lubrication oil toward the planetary gear set PS.

According to various embodiments of the present invention, the sun gear and the ring gear of the planetary gear set disposed on the input shaft IS, together with the first motor/generator and the hollow shaft, are rotatably supported on the transmission housing through the bearings, respectively, the number of components may be reduced and a compact design of the transmission system can be achieved.

Since the bearing for the first motor/generator is inserted in the interior diameter of the hub connected to the rotor of the first motor/generator, a length of the transmission housing may be shortened.

Since the parking gear is connected to the outer shaft MS2 having relatively large inertia, parking impact may be reduced.

In addition, since the tank for collecting the churning oil is disposed above the first and second output gears, cooling oil can be supplied to the second motor/generator MG2 easily when the vehicle runs at the EV mode.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system of a hybrid electric vehicle comprising:
   first and second motor/generators;
   a planetary gear set;
   first and second output gears;
   a brake;
   a rotation restricting member on an axis of an input shaft receiving torque of an engine in a transmission housing; and
   a hollow shaft disposed at a radial exterior of the input shaft and adapted to transmit the torque of the engine or torque of the first motor/generator to the second output gear, an outer shaft disposed at a radial exterior of the hollow shaft and adapted to transmit torque of the second motor/generator to the first output gear, and a rear cover coupled to a rear end portion of the transmission housing,
   wherein the planetary gear set includes a sun gear, a planet carrier and a ring gear as rotation elements thereof, and
   wherein the sun gear is rotatably supported on the transmission housing through a first bearing in a state of being splined to a hub connected to a rotor of the first motor/generator, the ring gear is connected to a connecting member through the hollow shaft rotatably supported on the transmission housing through a second bearing, and the planet carrier is rotatably supported by third bearings disposed respectively between the planet carrier and the sun gear and between the planet carrier and an extended end of the hollow shaft.

2. The transmission system of claim 1, wherein the rotation restricting member, the second output gear, the first output gear, the second motor/generator, the planetary gear set, the first motor/generator, and the brake are sequentially disposed from the engine side to a rear of the transmission housing.

3. The transmission system of claim 1, wherein the first motor/generator is rotatably supported by a fourth bearing interposed between one end portion of an interior circumference of the hub connected to the rotor of the first motor/generator and an exterior circumference of a fixed end formed on an inner surface of the rear cover, and the first bearing is interposed between another end portion of an exterior circumference of the hub and the transmission housing.

4. The transmission system of claim 3, wherein each of the first, second, and fourth bearing is a ball bearing, and the third bearing is a thrust bearing.

5. The transmission system of claim 1, wherein the rotation restricting member is a one-way clutch, a two-way clutch or a brake.

6. The transmission system of claim 1, further comprising a parking gear disposed between the first output gear and the second output gear and connected to the outer shaft.

7. The transmission system of claim 6, wherein a snap ring for fixing the parking gear in an axial direction and a fixing ring for preventing decoupling of the snap ring are mounted on the outer shaft.

8. The transmission system of claim 3, wherein the second output gear is splined to a front end portion of the hollow shaft, and a fifth bearing is interposed between an exterior circumference of an extended portion of the second output gear and the transmission housing.

9. The transmission system of claim 1, wherein a hub connected to a rotor of the second motor/generator is splined to the outer shaft, and a snap ring for fixing the hub in an axial direction and a fixing ring for preventing decoupling of the snap ring are mounted on the outer shaft.

10. The transmission system of claim 1, wherein the brake is disposed between the rear cover and the hub connected to the rotor of the first motor/generator.

11. The transmission system of claim 2, wherein a tank for collecting a churning oil is disposed above the first and second output gears in the transmission housing.

12. The transmission system of claim 1, wherein a lubrication pipe is mounted between the input shaft and a fixed end formed on an inner surface of the rear cover.

13. The transmission system of claim 12, wherein one end of the lubrication pipe is fixedly inserted in an oil path of the fixed end and another end of the lubrication pipe is inserted in an oil path of the input shaft with forming a gap therebetween.

* * * * *